Figure 1:
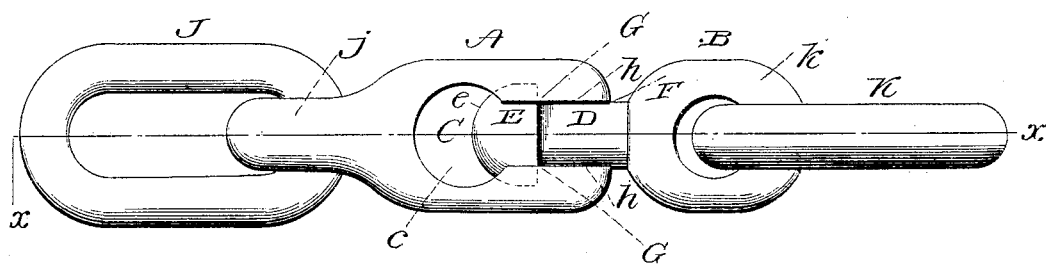

(No Model.)

R. LEE.
ROPE OR CABLE COUPLING.

No. 534,165. Patented Feb. 12, 1895.

Witnesses

Robert Lee
Inventor
By Edson Bros
Atty's

UNITED STATES PATENT OFFICE.

ROBERT LEE, OF ROCK ISLAND, ILLINOIS.

ROPE OR CABLE COUPLING.

SPECIFICATION forming part of Letters Patent No. 534,165, dated February 12, 1895.

Application filed November 17, 1894. Serial No. 529,182. (No model.)

*To all whom it may concern:*

Be it known that I, ROBERT LEE, a citizen of the United States, residing at Rock Island, in the county of Rock Island and State of Illinois, have invented certain new and useful Improvements in Rope or Cable Couplings; and I do hereby declare the following to be a full, clear, and exact description of the invention, such as will enable others skilled in the art to which it appertains to make and use the same.

My invention relates to improvements in rope and cable couplings, especially designed for service in connection with cables used in hauling heavy objects, such for example as loaded mine cars, although the coupling is equally adapted for cables or ropes to be used in other hauling operations; and the object that I have in view is to provide an improved coupling by which the ends of a rope or cable can be easily and quickly connected or united together, and which is of such strong and simple construction that it will stand the strain and wear of heavy hauling, without liability of uncoupling, and which also serves the purposes of a swivel between the ends or sections of the cable, to prevent the latter from twisting, and to enable the connected ends of the cable to easily and freely pass around sheaves and through guides provided for the direction of the cable.

I am aware that previous to my invention it has been proposed to provide a fastener or coupling embodying, in one instance, a ball and socket joint between the two members of the fastener, and in another example, a connector provided at its respective ends with balls or enlargements fitted in two ball-shaped sockets on the contiguous ends of belt or cord; but in all previous devices known to me the coupling has not been constructed in such a substantial and strong manner as to adapt it for use on heavy hauling cables or ropes such as are used, for example, in moving loaded coal cars up an inclined grade, because the ball and socket connection between the members of previous couplings were so formed that the balls would be pulled out of the sockets under heavy hauling strain.

In the embodiment of my improved coupling, I construct one member out of a single casting or forging with a longitudinal socket which opens laterally, at its inner end, through one face of the member, a contracted passage that extends from one end of said socket and opens through the end of the member, and a contracted slot extending from the socket and passage through one side of the member, and said neck forming longitudinal flanges, and the contracted passage producing, between itself and the socket, transverse, strain-resisting, solid shoulders which afford a large bearing surface, combined with another member which has a reduced strong shank and a solid head that is rounded on one side and formed with a flat straight face on the other side, which flat face of the head is arranged to bear against the transverse, solid, strain-resisting shoulders of the first named member, as will be hereinafter more fully described and claimed.

To enable others to more readily understand my invention, I have illustrated the preferred embodiment thereof in the accompanying drawings, forming a part of this specification, and in which—

Figure 2:
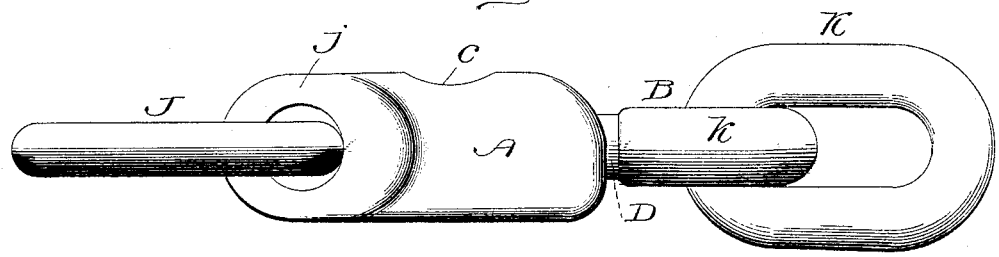
Figure 3:
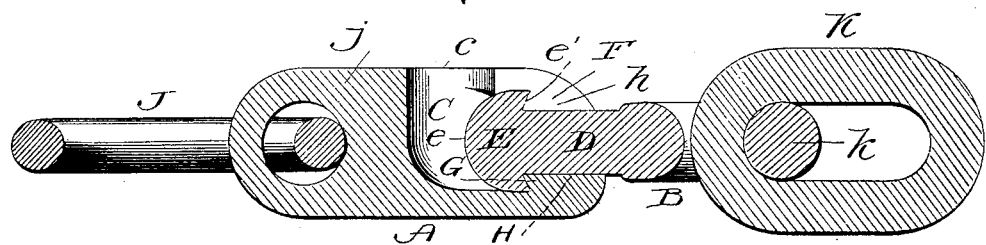

Figure 1 is a plan view of my improved rope or cable coupling. Fig. 2 is a side view thereof, and Fig. 3 is a longitudinal sectional view on the plane indicated by the dotted line $x$—$x$ of Fig. 1.

Like letters of reference denote corresponding parts in all the figures of the drawings, referring to which—

A designates one member of the coupling, and B the other member thereof, both of which are wrought or cast in a substantial manner. The member A is provided with an elongated, longitudinal socket, C, which is made about centrally therein to leave sufficient metal at the ends of the member to insure the desired strength and stability. The other member, B, of the coupling has a strong shank, D, and an enlarged solid head, E, wrought or forged from a single piece of metal, and this head, E, is adapted to be fitted in the socket, C, of the member, A, so as to form a swivel connection between the two members, A, B, forming the coupling, thereby permitting the coupling for the rope or cable to easily and freely pass around a sheave or through guides provided for the direction of the hauling cable.

In order that the headed shank B, may be connected to, or disconnected from, the socketed member A in an easy and quick way, and at the same time to provide for the proper engagement of the members to prevent them from separating when the pull on the cable is slackened, I construct the member, A, in a peculiar way to receive and retain the headed member, B.

Through one end of the member, A, is cut or produced a passage, F, which opens at one end into the socket, C, and at its other end the passage opens through the end of the member, A, and this passage is of less diameter than the width of the socket, C, whereby there is produced between the passage and socket, the abrupt shoulders or bearings G, G. The rear end of the socket, C, or that end opposite to the passage, F, opens through one side or face of the member, A, to produce the rounded opening, c, and from this lateral opening, c, extends a longitudinal slot that is cut or otherwise produced in the side or face of the member through which the opening, c, extends. This slot is cut through to, and communicates with, the passage, F, and with the socket, C; and the width of this slot is less than the width of the socket, C, whereby there is produced the overhanging flanges or ledges, h, h, which extend from the opening, c, to the end of the socket, C, and to the abrupt shoulders, G, G.

The other member, B, has its strong shank D, made of such size as to pass through the slot H and to fit snugly in the passage F of the member, A; and the enlarged head, E, of said member B is made of greater width than the passage, F, and the slot, H, and nearly equal to the width of the socket C, whereby the head is adapted to fit snugly in the socket C of the member A, beneath the overhanging flanges, h, h, and to bear or pull against the solid transverse strain resisting shoulders, G, G, near one end of the member, A.

To provide for the ready connection of the ends of the rope or cable to the coupling, I provide the member, A, with an eye, j, in which is fitted a link J, while the other member B is enlarged to form the eye k, to receive another link, K, the ends of the cable being fastened to these two links J, K, in any suitable way known to those skilled in the art.

The members of the coupling may be easily connected together by fitting the head E and shank D, of the member B into the opening, c, and the slot H of the member A, then depressing the head and shank D, E, into the socket C and slot F, and then pulling the members away from each other to force the head, E, beneath the flanges h, h, and against the solid walls G, G, at the end of the socket. The operation of uncoupling the members A, B, is the reverse of that just described, and will be readily understood.

By reference to the drawings, it will be noted that I have made the head, E, substantially hemispherical in form, or with a rounded side, e, and that the opposite face, e', of said head is flat or slightly concave, to form a solid bearing against the transverse solid shoulders or walls G, G, of the member A. These solid walls or shoulders on the socketed member A, and the enlarged head, E, of member, B provide large bearing surfaces and insure sufficient strength to the coupling to enable it to successfully withstand the strain or pull of cables or ropes engaged in heavy hauling operations. The rounded form of the head, E, and a limited play of the shank, D, of member B in the socket C, passage, F, and slot H of member, A, insure a swivel joint which obviates twisting of the cable and which permits the coupling to easily and freely pass around a sheave or through guides usually provided for the cable, while the employment of the overhanging solid flanges, h, h, prevents the headed member, B, of the coupling from slipping accidentally out of the socket in the member, A.

From the foregoing description it will be seen that I have provided an improved coupling of great strength which will successfully stand the strain of hauling cables for heavy loads.

The coupling is very simple and durable in construction, capable of being easily and quickly operated to connect and disconnect the two ends of a cable or rope, and it is cheap of manufacture.

Having thus fully described my invention, what I claim as new, and desire to secure by Letters Patent, is—

In a rope or cable coupling, substantially such as described, the member A provided with a longitudinal socket C, which opens at one end, c, through one side of the member, the passage, F, of less diameter than the socket and forming therewith the solid abrupt shoulders or walls G, G, and the slot H connected with the passage and with the socket, and of less width than the latter and producing the overhanging flanges h, h, combined with the member, B, formed with the solid shank and head, said head, B, having a rounded side and a substantially flat face, as and for the purposes described.

In testimony whereof I affix my signature in presence of two witnesses.

ROBERT LEE.

Witnesses:
WILLIAM HADDICK,
LOUIS E. ROSENBERG.